(12) United States Patent
Miller et al.

(10) Patent No.: US 10,083,535 B2
(45) Date of Patent: Sep. 25, 2018

(54) ANIMATION OF CUSTOMER-PROVIDED CODES

(71) Applicant: Animated Codes Made Easy LLC, Glendale, CA (US)

(72) Inventors: Peter Miller, Glendale, CA (US); Will Bilton, Glendale, CA (US)

(*) Notice: Subject to any disclaimer, the term of this patent is extended or adjusted under 35 U.S.C. 154(b) by 0 days.

(21) Appl. No.: 15/250,914

(22) Filed: Aug. 30, 2016

(65) Prior Publication Data

US 2017/0061667 A1 Mar. 2, 2017

Related U.S. Application Data

(60) Provisional application No. 62/213,062, filed on Sep. 1, 2015.

(51) Int. Cl.
| | | |
|---|---|---|
| *G06T 13/20* | (2011.01) | |
| *G06T 13/80* | (2011.01) | |
| *G06Q 10/00* | (2012.01) | |

(52) U.S. Cl.
CPC .............. *G06T 13/20* (2013.01); *G06Q 10/00* (2013.01); *G06T 13/80* (2013.01)

(58) Field of Classification Search
CPC .......... G06T 13/00–13/80; G06T 15/00–15/87
See application file for complete search history.

(56) References Cited

U.S. PATENT DOCUMENTS

| | | | | |
|---|---|---|---|---|
| 2011/0064388 | A1* | 3/2011 | Brown | G06T 13/20 386/285 |
| 2012/0067943 | A1* | 3/2012 | Saunders | G06K 7/1095 235/375 |
| 2012/0211567 | A1* | 8/2012 | Herzig | G06K 7/1093 235/488 |
| 2013/0343467 | A1* | 12/2013 | Sogani | G06T 7/0002 375/240.25 |
| 2014/0326793 | A1* | 11/2014 | Windmueller | G06K 19/06037 235/494 |

OTHER PUBLICATIONS

Wakahara, Toshihiko, and Noriyasu Yamamoto. "Image processing of 2-dimensional barcode." Network-Based Information Systems (NBiS), 2011 14th International Conference on. IEEE, 2011.*

* cited by examiner

*Primary Examiner* — Daniel Hajnik

(57) ABSTRACT

Disclosed herein is an online software application for providing users or customers with newly created animated equivalents of their originally submitted static (aka, un-animated) scannable codes.

16 Claims, 15 Drawing Sheets

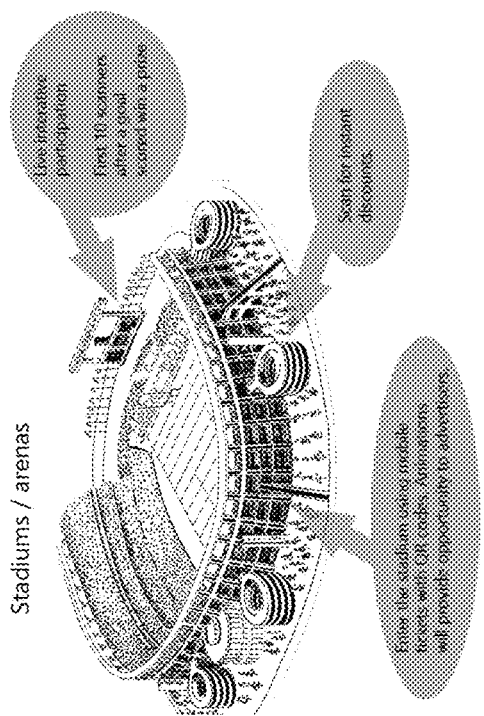
Fig. 4 Stadiums / arenas
Fig. 6 TV Broadcasting displays
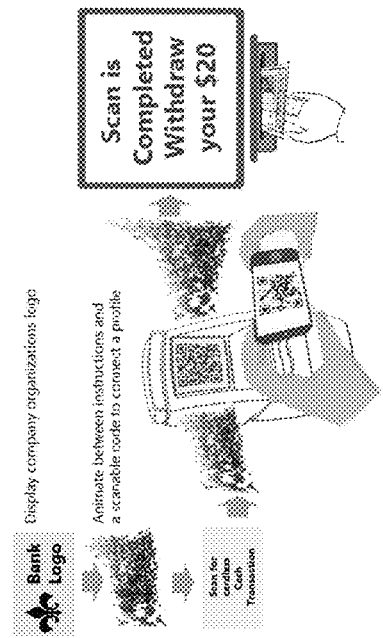
Fig. 5 Cardless ATM machines

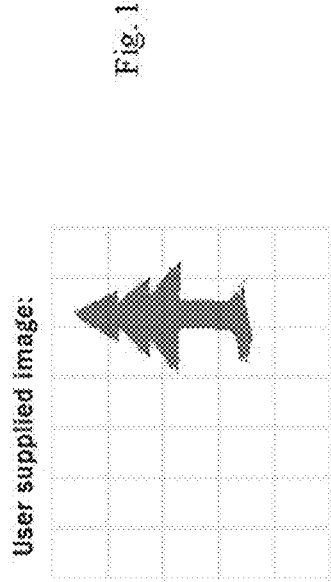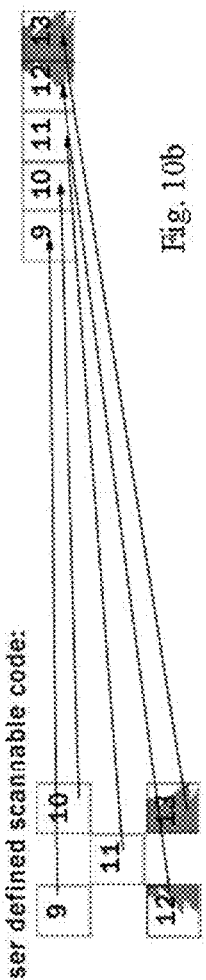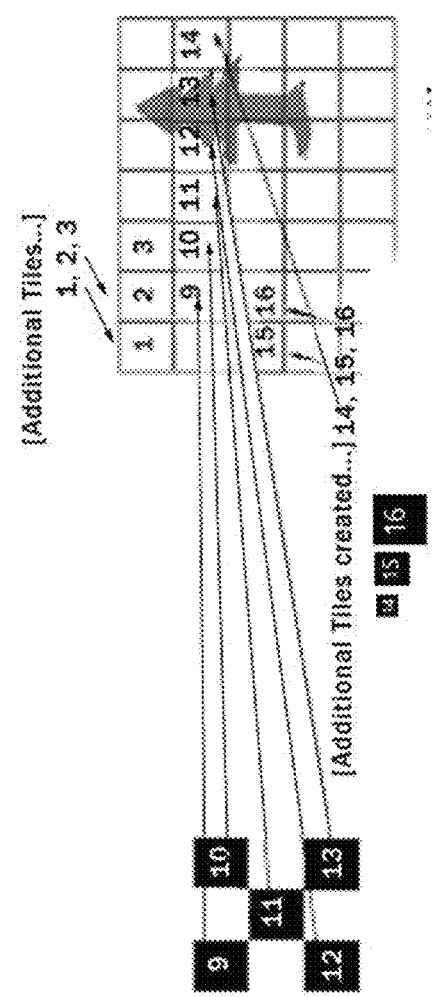
Fig. 10a
Fig. 10b
Fig. 10c

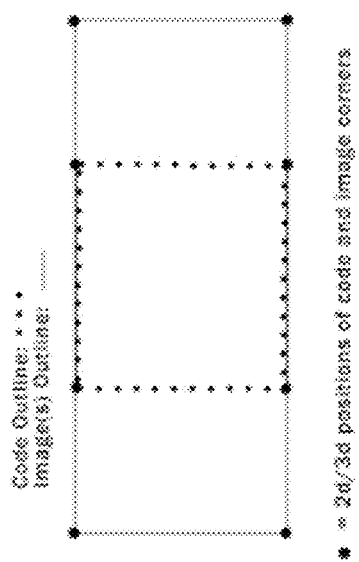
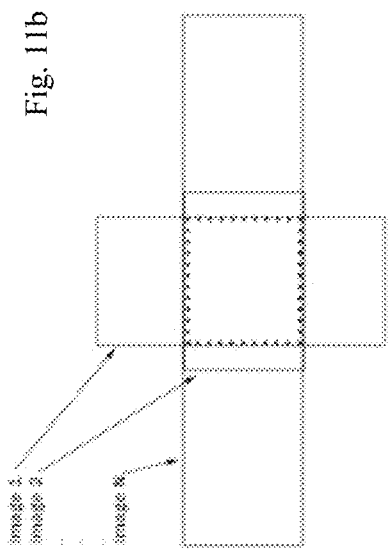
Fig. 11a
Fig. 11b

With two user inputs of scannable code and image(s):

"Code Landing Spaces" x/y grid:

"Image Landing Spaces" x/y grid:

Animating Tiles with animated positions, colors, textures, sizes and shapes:

ANIMATION OF CUSTOMER-PROVIDED CODES

FIELD OF THE INVENTION

The present invention relates generally to the field of animation automation, and more particularly, to a web-based software application that provides animations for user-submitted static or un-animated scannable codes.

BACKGROUND

Computer animation is a process used for generating animated images. Usually computer animation can be created with a computer and some animation software. Some impressive animation can be achieved with basic programs; however, the rendering of animation can take a lot of time on an ordinary home computer. Professional animators of movies, television and video games could make photorealistic animation with high detail, but this level of quality for movie animation would take hundreds of years to create on a home computer. Thus, a need exists for an easy and user-friendly way to create animations without requiring massive powerful workstation computers. Particularly, there is a need for some animation software that can instantaneously generate animations for user-submitted messages, such as a message including scannable codes (e.g., bar code or Quick Response code).

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

Embodiments of the present invention are directed to an online software application for providing users or customers with newly created animated equivalents of their originally-submitted static (aka, un-animated) scannable codes. Such scannable codes may include a bar code, a QR code, a combination or any equivalent thereof One embodiment of the invention provides a method for generating animations for user-submitted scannable codes, comprising: receiving a user request over a network for creating animation of scannable codes, the user request including either one or more scannable codes or a message to be embedded in the scannable codes; receiving a plurality of animation parameters selected by the user; generating an animated file based on the animation parameters for the user's preview, the animated file including animations of the scannable codes; and upon the user's confirmation of purchase, sending the animated file for a display on the user's device. In one embodiment, the animated file is generated through one or more of the following steps: detecting the scannable codes from the user request; abstracting 2 dimensional (2D) data from the detected scannable codes, the 2D data including locations, dimensions, color and shape of each code tile in the scannable codes; storing the 2D data in a tile database; based on the abstracted 2D data, converting a 2D model of the scannable codes into a 3 dimensional (3D) model of the scannable codes, the 3D model comprising a plurality of 3D geometric icons based on the 2D code tiles; applying colors and textures to the plurality of 3D geometric icons; identifying a first list of landing spots for the scannable codes and a second list of landing spots for an original image corresponding to the scannable codes; comparing the first and second lists to identify additional tiles; creating animations of the additional tiles so that the additional tiles are animated to match border areas of the codes and image; and arbitrarily selecting one or more frames of animation out of all animation frames created for the scannable codes, wherein the additional tiles are animated with various animated positions, colors, textures, sizes and shapes during the selected one or more frames.

Another embodiment of the present invention provides a computer program product comprising a computer usable non-transitory medium (e.g. memory or storage device) having a computer readable program code embedded therein for controlling a data processing system, the computer readable program code configured to cause the computer in the data processing system to execute the above method.

Embodiments of the invention can be implemented by a proprietary software platform, which is accessible via an HTML web browser and/or native iOS, Android apps, and any other equivalent mobile application platforms.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIGS. 3a-b and 4-6 demonstrate exemplary use cases in which a web-based animation software application can be applied according to embodiments of the invention;

FIGS. 10a-c, 11a-b, 12a-b and 13a-b illustrate a 3D geometry coloring and texturing module in the animation software application according to embodiments of the invention;

DETAILED DESCRIPTION OF EXEMPLARY EMBODIMENTS

Figure 1A:
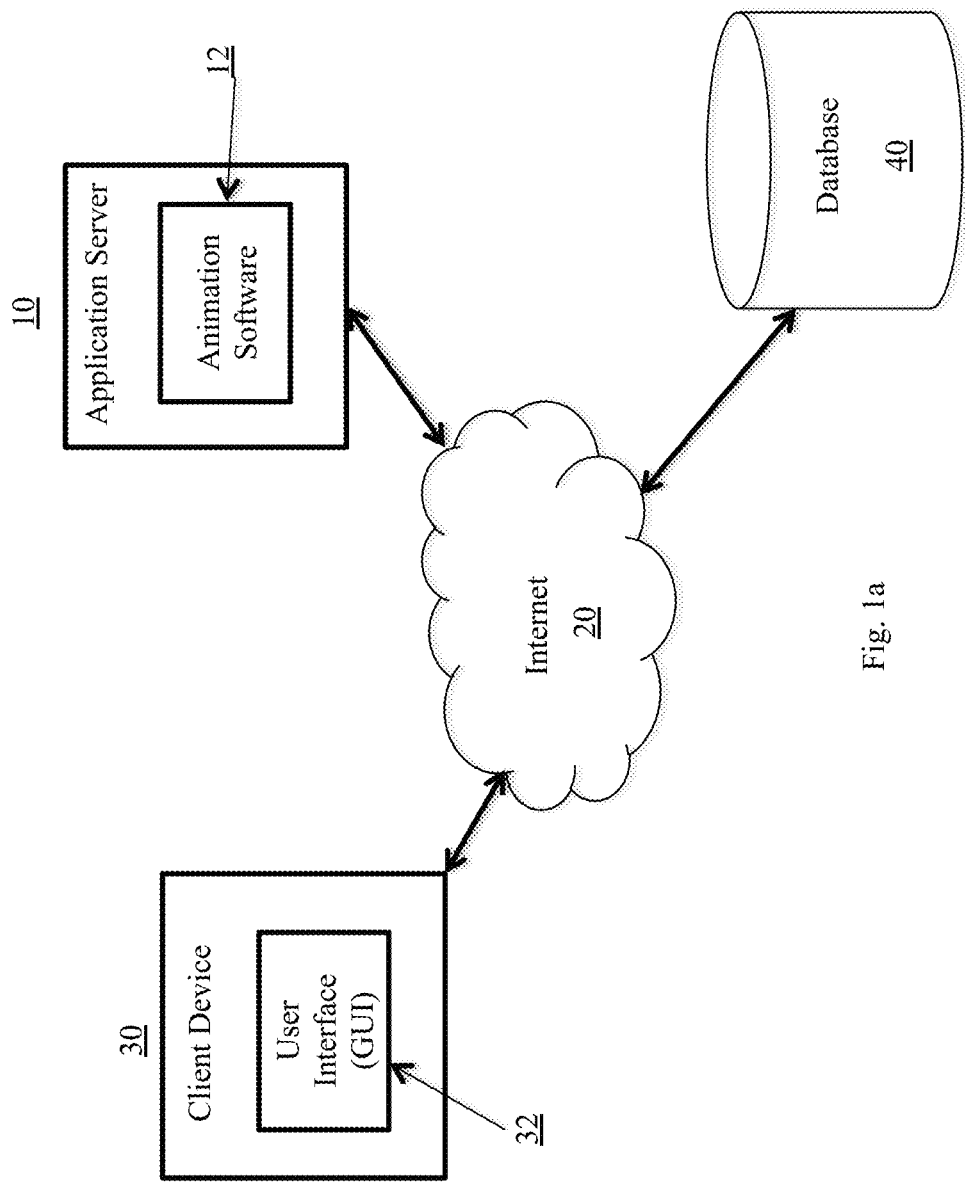
FIG. 1a is a schematic diagram providing a high-level overview of the system architecture in which a web-based animation software application can be implemented according to embodiments of the invention.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Embodiments disclosed herein are directed to an online software application, based on the established Internet REST API standards, for providing users or customers with newly created animated equivalents of their originally-submitted static (aka, un-animated) scannable codes. As compared to the original customer-supplied codes, the animations created by the application, which contain the original supplied codes, are not only visually improved in terms of attractiveness and attention attainment, but also human-identifiable with regard to the code source or author. In addition, by including certain visual cues that are difficult to reproduce but easy to review, such animations allow any viewer to evaluate the authenticity of the animated code via a simple visual review, just like how people can easily verify the authenticity of some printed physical currency. Besides, embodiments of the invention provide for personalization of animations, for example, any given individual may create or customize his or her own animated code, which further enhances one's ability to visually validate an authentic animated code from a falsified animated code. Also, the animations are created in an automated or reproducible process. In one embodiment, the animations are created "on demand" by the application with full automation and almost on a real-time basis (e.g., <10 seconds commonly, up to 1 minute).

Referring to FIG. 1a, disclosed therein is a high-level overview of a system architecture in which a web-based animation software application can be implemented according to embodiments of the invention. As shown in FIG. 1a, the animation software application 12 can be implemented in an application server 10 connected to the Internet 20, through which a client device 30 (e.g., a mobile device, a computer, a tablet, etc.) may access the software application 12. In one embodiment, a client application for animation (not shown) may be downloaded in the client device 12 or accessible through a user interface (e.g., a web-based GUI) 32. Also through the Internet 20, the application server 10 can have access to remote databases, such as the database 40, in which large volumes of image or animation data are stored. The application server 10 may also have local memories for storing some of these image or animation data.

Figure 1B:
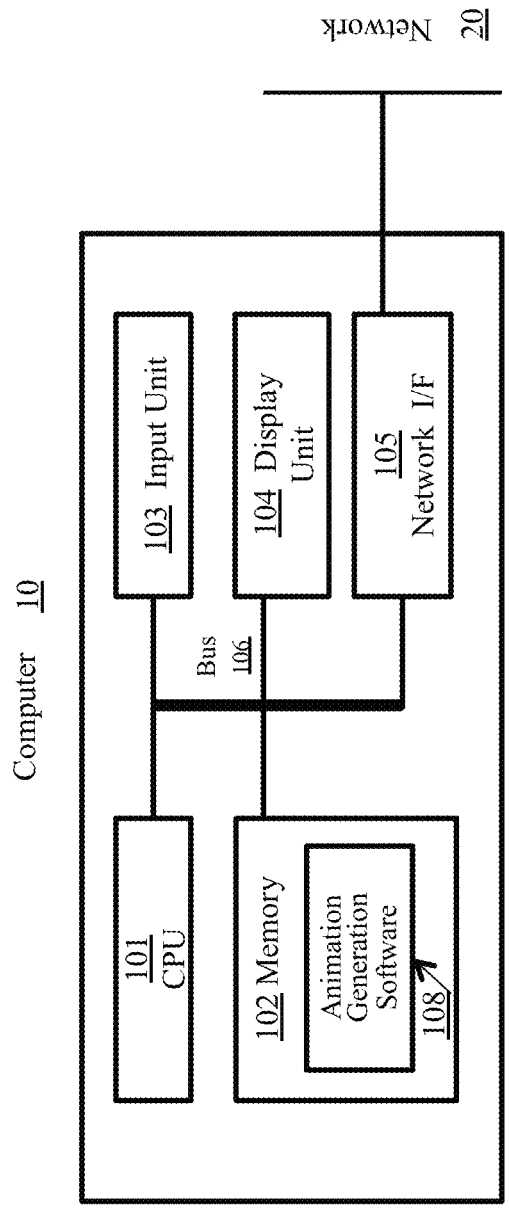
FIG. 1b is a block diagram providing a simplified view of a computer in which a web-based animation software application can be implemented according to embodiments of the invention.

In one embodiment, the application server 10 comprises a computer as shown in FIG. 1b. This computer 10 comprises a Central Processing Unit (CPU) 101, a memory 102, an input unit 103 such as a keyboard or a tablet stylus pen, a display unit 104 such as a computer monitor or touchscreen display, and a network interface 105, all these components (including those not shown) communicating with each other internally via a bus 106. Through the network interface 105, the computer 10 is connected to a network 20, such as a LAN or WAN or the Internet, and communicate with other devices connected to the network.

Usually the memory 102 stores computer-executable instructions or software programs accessible to the CPU 101, which is configured to execute these software programs as needed in operation. Preferably, such software programs are designed to run on Windows OS, Macintosh OS, or Unix X Windows or other popular computer operating systems implementing a GUI (graphic user interface), such as a touchscreen and/or a mouse and a keyboard, coupled with a display monitor. In one embodiment, such software in the memory 102 includes an animation generation software 108, which, when executed by the CPU 101, enables the computer 10 to generate animations for user-submitted static codes. As will be described in detail below, the animation generation software 108 enables the computer 10 to generate animations by receiving user-submitted scannable codes as well as user-selected animation parameters and animation type, generating an animated file for the user preview and sending the animated file to display on the user' s device.

In addition to the animation generation software 108, the CPU 101 is also configured to execute other types of software (e.g., administrative software), applications (e.g., network communication application), operating systems, etc.

Figure 2:
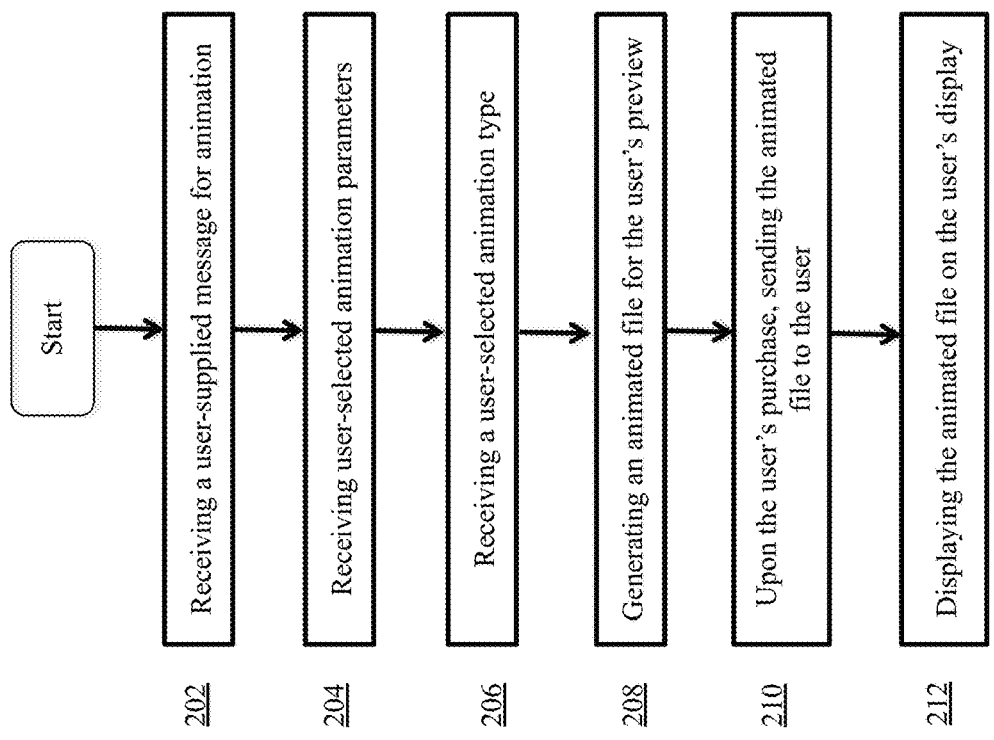
FIG. 2 is a flow diagram illustrating an exemplary animation creation process according to embodiments of the invention.

FIG. 2 is a flow diagram illustrating an exemplary animation generation process implemented in the animation generation software according to embodiments of the invention. As shown in FIG. 2, this process starts at step 202, where a user-supplied message for generating animation is received from a user interface, such as a web-based GUI. In one embodiment, the user-supplied message includes some standard and un-animated scannable codes, for which animations will be generated. Alternatively, the message may only include certain data that the user wishes to have embedded in scannable codes, in which case the scannable codes are first created for the user-submitted data before any animation is generated.

Along with the message or request for generating animations for user-submitted codes or data, the animation generation software allows the user to define or specify some basic qualities of the final animated codes. For example, the user may select a plurality of animation parameters as follows: image resolution, code shapes (aka, "tiles" of scannable codes, such as squares, circles or any repetitive icon shape), color(s) or images to be applied or animated (the user can choose from a library of custom colors, animated colors, or specify his/her custom colors), means and digital format of the final animation receipt (e.g., gifs, movie files like ".mov" or ".avi," 3D standard shape files such as ".FBX"), entire timing of the animation, which is defined by an absolute frame count or a percentage of the default time of the selected animations, and time blocks of the component animations, which is defined by an absolute frame count or a percentage of the default time of the selected component animations. By selecting the entire timing and component time blocks of the generated animations, the user can control how long his/her logo or promotion or code will be displayed without interruption. At step 204, the animation software receives these animation parameters and their values selected by the user.

In addition, at step 206, the animation software receives an animation type selected by the user. Specifically, the user can select from a list of existing animations from an animation library. The list of animations presented to the user may be organized in a taxonomic (hierarchical) way, or the user can choose to browse the animations in a "flat list." The user may also choose an animation type from a hierarchical list of an arbitrarily limited depth, in which case the user can customize how organized or granular the list should be for him/her to browse the organized branches of animation types.

Then, at step 208, the animation software generates an animated file for the user's preview. Before paying for the final version of animation, the user can choose to have a preview of the animation applied to a demonstration code, which includes (by "wrapping") the user-supplied message received at the beginning step 202. This allows the user to check the quality of the actual animation generated for the initial scannable code message, and also to verify whether the resulting animated version of the code is still scannable. If the user is not satisfied with the previewed animation, he or she can go back to the previous steps and change the selection of one or more animation parameters, such as the resolution, color, etc.

Once the user is satisfied with the previewed animation, he or she can purchase the working animated code by supplying certain financial information, which can be taken through a standard third party purchase service provider. When the purchase transaction is complete, at step 210, the animated file that contains the use's original (unwrapped) message will be sent to the user. In one embodiment, the user can download the animated file directly from the user interface. Or the animated file can be emailed to the user.

Finally, at step 212, the animated file can be displayed on the user's device using any animated display technology of his or her choice. This includes, without limitation to, televisions, electronic monitors placed in public or private display, digital projection systems of any size, Virtual Reality ("VR") systems and Augmented Reality ("AR") systems. FIGS. 3*a-b* and 4-6 demonstrate a few exemplary case scenarios where such animated files can be created and displayed according to embodiments of the invention.

Figure 3A:
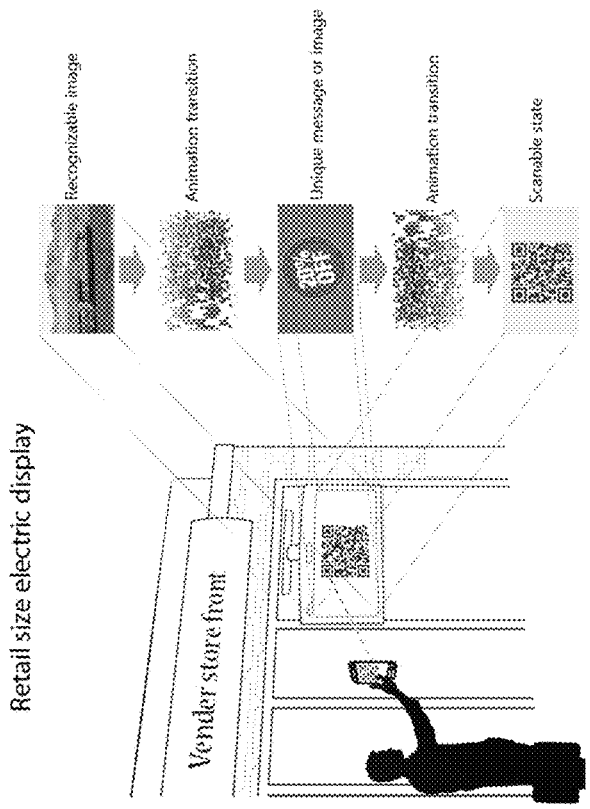
Figure 3B:
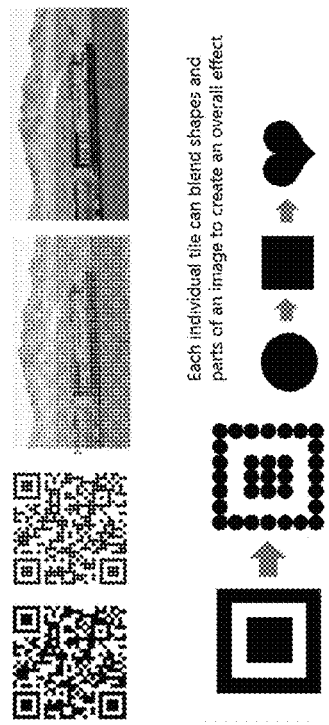

For example, as shown in FIG. 3*a*, an animated file can be displayed on an electronic display at a retail store. In this case, a recognizable image is first provided, for which an animated file is generated. After the initial animation transition, an additional input, be it a unique message or image (e.g., a "20% Off" promotion message), can be included for further animation transition. As a result, a scanable code (e.g., a QR code or bar code) is generated for display on the electronic display. In one embodiment, the displayed code may alternate between in an animated state or scannable state. In the latter case, a user can use his or her personal portable device (e.g., a mobile phone or tablet) to scan the displayed code to obtain the embedded data, e.g., the "20% Off" promotion message. In one embodiment, the scannable code may comprise a plurality of individual code tiles, and each tile can be of a different shape or part of an image. As illustrated in FIG. 3*b*, a code tile can be of a square, a circle or a heart shape. All those different shapes can be combined in various mix-and-match styles to form the final code image.

FIG. 4 demonstrates another use case where the animation generation software according to embodiments of the invention is utilized in a sports stadium with particular benefits to advertisers. For instance, during the course of the game, QR codes may be generated using the animation software and displayed in the big screen of the stadium, and as such, sports viewers can scan the QR codes displayed in their scannable state for discounts or raffle prizes. In another embodiments, users can enter into the stadium using mobile tickets with animated QR codes embedded therein.

In FIG. 5, the animation generation software according to embodiments of the invention can be used on a bank or ATM machine. In this case, a bank or company logo is first displayed on the ATM screen. Then an animated profile that includes certain transaction instructions and a scannable code is displayed for a user to scan. Once the user finishes scanning the code, the display will change to a confirmation message that the transaction embedded in the code ("cash withdrawal) is ready to make.

FIG. 6 presents another case scenario for using the animation software according to embodiments of the invention. In this case, an animated profile is created to embed a soccer image as well as a scannable code that activates a user action, such as a request to replay the soccer game. Such animated profile is displayed on the TV screen for the user to scan. In one embodiment, the display of the animated profile changes from an animated state to a static state, where the user can scan the scannable code using a portable device. After the user successfully scans the code, the embedded user action (e.g., a replay of the soccer game) will be activated. Because TV displays usually require a bright color, typically the white color, a stencil code is created to allow the user to overlay the animated code(s) on the background image or animation. Rather than creating the geometry for the marking color of the original code (usually black), this stencil option allows for creating the geometry in the negative space color of the original code (usually white). With the stencil option, a user or customer is able to overlay the animated codes on darker backgrounds, which can be partially seen through the code. This is particularly useful if the user or customer chooses a code type or specification that the original code markings should be darker than the background color. In that case, if, without the stencil option, the animated code is created simply in white color rather than black and then overlaid on a darker background image, the code may not be scannable. But if the stencil option is used to create the geometry in a light tone and then overlay the created geometry on a darker image, the code will still be scannable.

Besides the above-described end user experiences, the animation generation software according to embodiments of the invention can be used by software developers who wish to generate animated codes programmatically without the need for human intervention. In this regard, software programmers may use an application program interface (API), based on the published API documentation for the animation generation software, to create their own software applications to interface with the inventive animation software for purposes of creating animated codes. This option allows businesses of any size to create large volumes of animated codes for permanent, limited or one-time uses in an efficient and consistent manner. For enhanced security, business users may install the animation generation software on their private servers rather than a remote application server (e.g., server 10 in FIG. 1) over the Internet via standard IP protocols.

Figure 7:
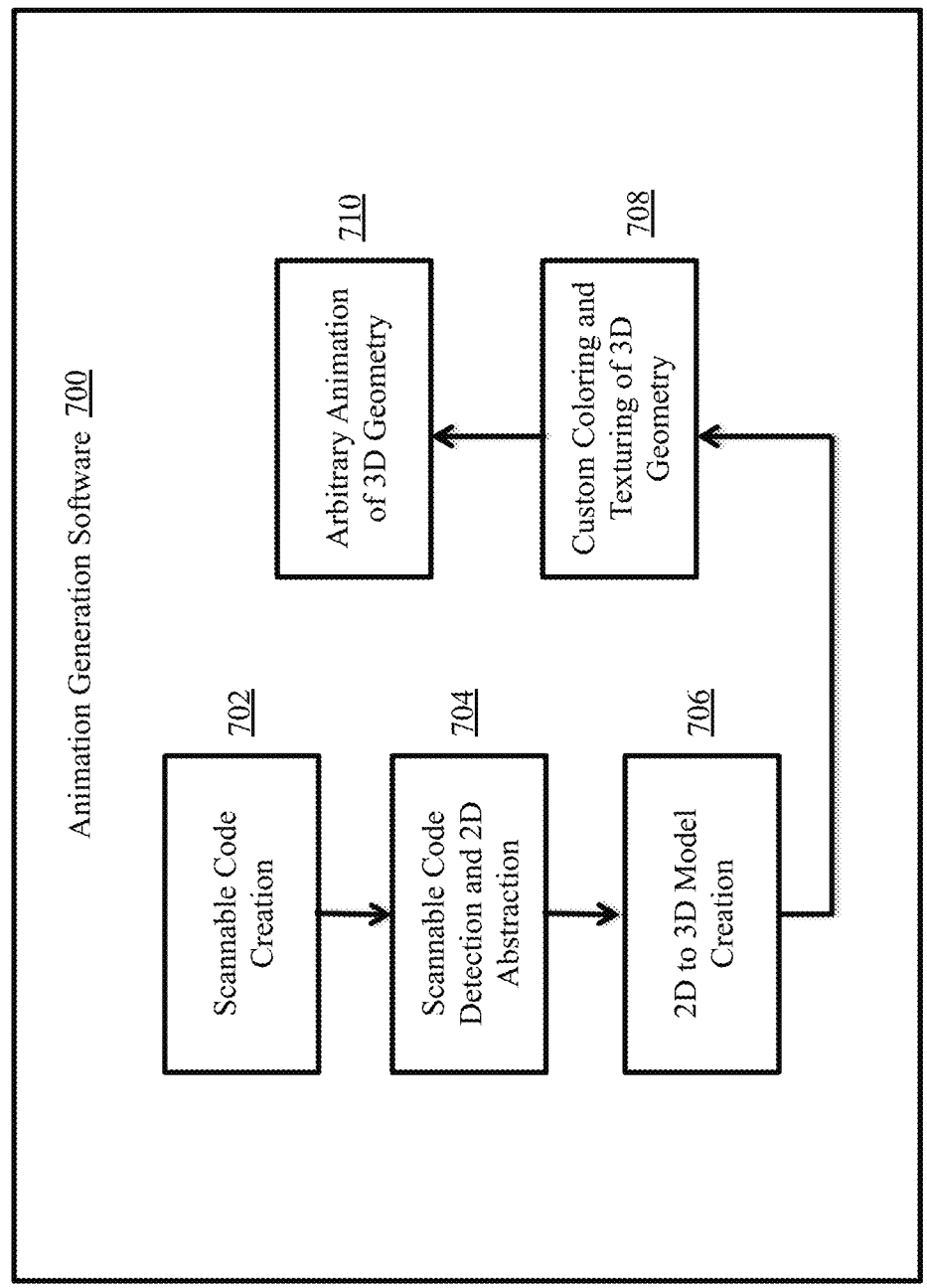
FIG. 7 is a block diagram showing exemplary executable modules implemented in the animation software application according to embodiments of the invention.

Turning to FIG. 7, disclosed therein is a block diagram showing exemplary executable modules implemented in the animation software application according to embodiments of the invention. As shown in FIG. 7, the animation generation software according to embodiments of the invention comprises a number of program modules configured to perform different functions, such as a scannable code creation module 702, a scannable code detection and 2D abstraction module 704, a 2D-to-3D model creation module 706, a custom coloring and texturing of 3D geometry module 708 and an arbitrary animation of 3D geometry module 710. It should be understood that the modules in FIG. 7 are for illustration only, and in operation, they can be implemented through various combinations, for example, all these modules can be embodied in one single piece of software code, or they can be further split into multiple sub-routines or functional codes.

Starting with the scannable code creation module 702, if a user supplies a text message to encode (e.g., "Hello world!"), a scannable 2 dimensional (2D) code image is first created using existing open standards in the industry. This optional feature gives the user certain flexibility in terms of what kinds of user input to be provided for creating new animated codes. In this case, the scannable 2D code image will be used as the input for the next module 704 for code detection and 2D abstraction. Alternatively, the user may directly supply a scannable code in the message, in which case the scannable code serves as the user input for the next module 704 to perform code detection and 2D abstraction.

Figure 8:
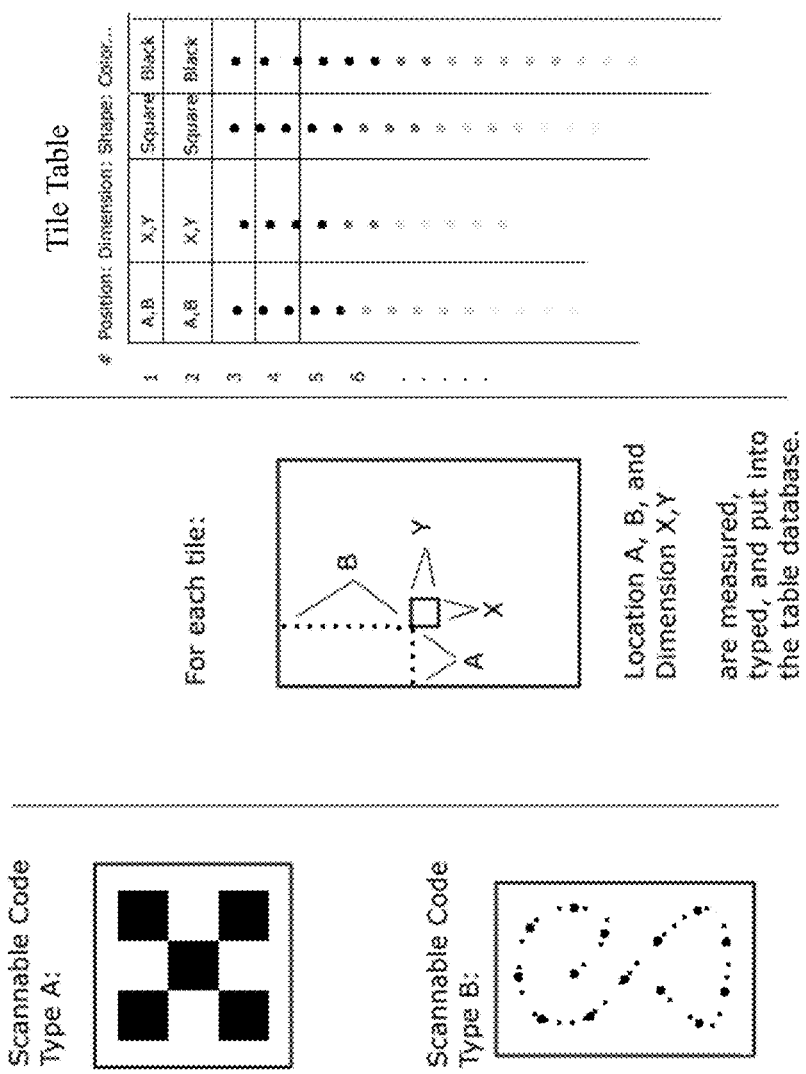
FIG. 8 illustrates a 2D code detection and abstraction module in the animation software application according to embodiments of the invention.

The module 704 is configured to process the 2D code image and detect each individual color component of the original code. For example, this module may identify the existence and location of individual code tiles (e.g., squares, dots, bars, or any other customized shapes) or arbitrary sub-components (i.e., groups of tiles) of the user-supplied unique graphical code. In doing so, no knowledge of the type of the scannable code is needed and only the dimensions, positions, colors and shapes of each code tile need to be identified. This means, any type of scannable codes can be animated under the present invention. FIG. 8 illustrates two types of scannable codes: Type A comprises a plurality of square-shaped code tiles, while Type B comprises a plurality of dot-like code tiles. For each code tile, its location (A, B) and dimension (X, Y) are measured and stored in a runtime database. As shown in FIG. 8, the "Tile Table" stores the detected and abstracted 2D data for each code tile, such as the tile position (A, B), dimension (X, Y), shape (e.g., square, dot, bar, etc.), color (e.g., black, white), etc. In one embodiment, this module can be accomplished through existing software algorithms designed to detect the basic bar, tile or dot components and their relative 2D grid placements to each other.

Figure 9A:
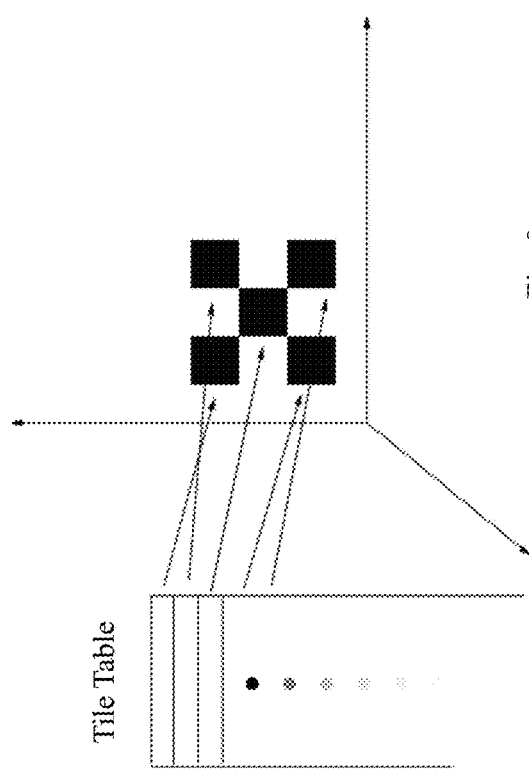
FIG. 9a-b illustrate a 2D to 3D conversion module in the animation software application according to embodiments of the invention.
Figure 9B:
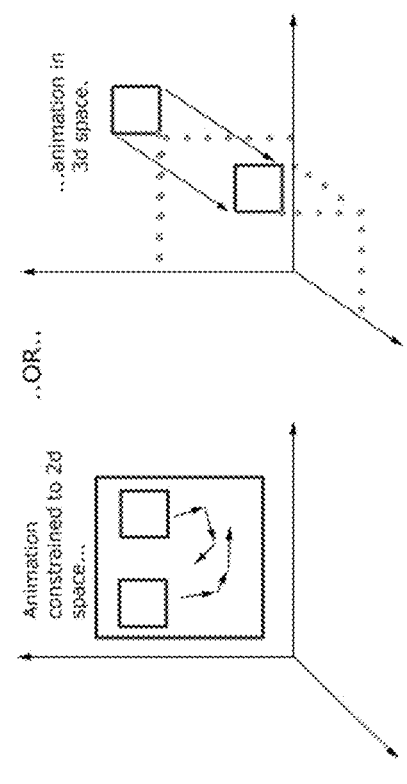

Once the 2D database of scannable code components are created, the next software module 706 creates a 3 dimensional (3D) geometry in a custom framework. FIGS. 9*a*-*b* demonstrate an exemplary conversion framework in which a 2D model is converted into to a 3D model. As shown in FIG. 9*a*, based on the "Tile Table" in FIG. 5 (i.e., abstracted 2D information), a 3D framework is created for the code components. Specifically, for each code tile, a 3D geometric icon is created, and these 3D geometric icons can be animated in either a 2D space or 3D space, as shown in FIG. 9*b*. In this embodiment, the framework designed for generating the defining 2D components into a 3D animation framework is independent of the type of scannable codes received as input. In actual implementations, this module 706 for creating a 3D geometric model can exist as an independent piece of software or as an added-on component to existing off-the-shelf 3D animation software.

Back to FIG. 7, after the 3D geometric model or framework is created, the module 708 for custom coloring and texturing of the 3D geometry applies colors (e.g., 3D animation "shaders" according to the industry standards) to the generated 3D components. The shaders can be simply the black color, or any customized or user-specified colors, or the colors of the animations themselves. In one embodiment, certain limitations may be applied to the colors or shaders to ensure basic scannability of the created code. The shaders can also contain complete or partial image components supplied or chosen by the user. For example, the user can create animated codes for a combination of a customer logo and a promotion message by first choosing or defining scannable codes for the logo and then adding scannable codes for the promotion message.

FIGS. 10*a*-*c* illustrate an exemplary coloring and texturing process in the module 708. As shown in FIG. 10*a*, a user may supply an image comprised of a plurality of code tiles, i.e., the tree image in a grid of squares. After the code abstraction (e.g., by the module 704 in FIG. 7), a user-defined scannable code may include a number of code tiles, such as tiles 9-13, as shown in FIG. 10*b*. Next, certain shaders (e.g., black color) may be applied to the chosen tiles 9-13, as shown in FIG. 10*c*. Also, additional tiles (e.g., tiles 1, 2, 3 . . . or tiles 14, 15, 16 . . . ) may be included, along with the chosen tiles 9-13, to form a complete and seamless image.

In addition to coloring the code tiles as described above, the module 708 is also configured for automatically resizing the image around the code. This process is demonstrated in FIGS. 11*a*-*b*. As seen in FIG. 11*a*, the dotted line outlines the scannable code, while the solid line outlines the original user-supplied image, whose width is bigger than that of the code. As a result, the module 708 automatically resizes the image by scaling one dimension of the image, e.g., the width shown in FIG. 11*a*, in the 3D space to match that of the code. This method of auto-sizing of images around the codes may also be applied in the case of multiple of images with overlapping areas or "landing areas" of code tiles. As shown in FIG. 11*b*, a number of images (image 1, image 2 . . . image n) overlap and the overlapping area of all images comprises an overlapping grid of tiles (i.e., the grid outlined by the dotted line). This overlapping grid of tiles, also known as the landing area, is defined by a number of tiles, each tile being a standard code size tile. In other words, the overlapping or landing area may be defined by a list of code tiles or landing spots (e.g., tile 9, 10, 11, 12 . . . ), while each image may also be defined by its unique list of code tiles or landing spots: image 1 (tile 1, 2, 3 . . . 9, 10, 11, 12 . . . ), image 2 (tile 8, 9, 10, 11, 12, 13 . . . ) . . . image n (tile −8, −7, . . . 9, 10, 11, 12, . . . +7, +8 . . . ). As shown in FIG. 11*b*, some images have a longer list of code tiles or landing spots than the scannable code.

Figure 12A:
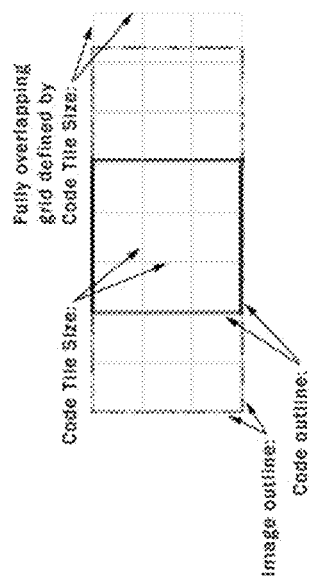
Figure 12B:
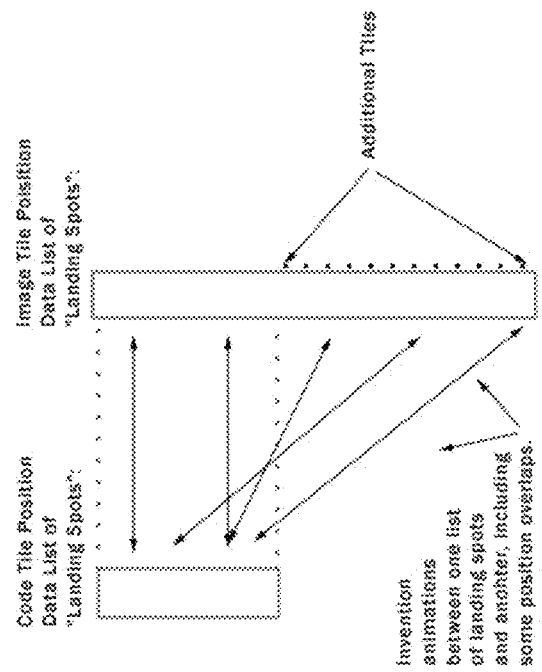

In actual implementations, the number of tiles for scannable codes is not always exactly equal to the number of similarly sized tiles for user-supplied images. For instance, as shown in FIG. 12a, because the image has a wider dimension than the code, the number of code size tiles for the code is less than the number of code size tiles to cover the image. In other words, the code has a shorter list of "landing spots" as compared to the image, as shown in FIG. 12b. In this case, additional tiles required by the user-supplied image are animated in order to overlap the landing spots on the shorter list of the code. In this manner, multiple image tiles may appear to animate to and from one scannable code tile, or the reverse. This allows the tiles animated from one code (or image) to blend smoothly between animated positions. In some cases, additional tiles are animated to become zero (0) in scale, and disappear or re-appear as needed.

Figure 13A:
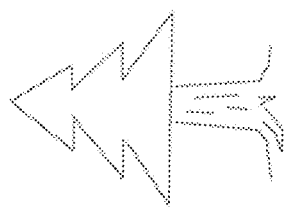
Figure 13B:
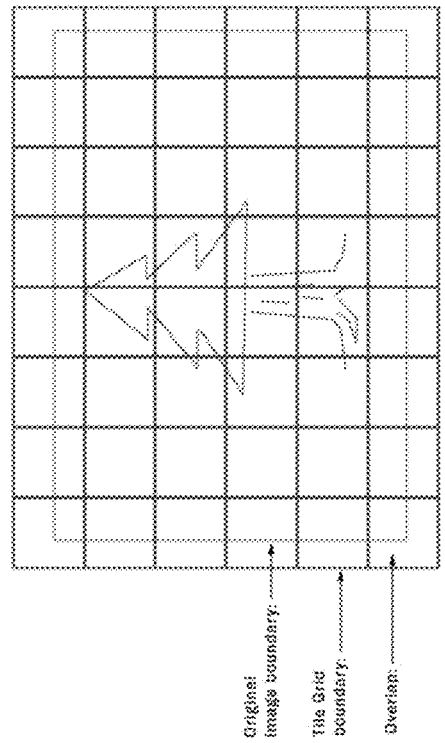

In addition, the module 708 is configured for texturing 3D geometric icons. This process is demonstrated in FIGS. 13a-b. A user-supplied image, i.e., the tree image in FIG. 13a, is divided into different segments in a grid of tiles. As shown in FIG. 13b, there is a gap between the original image boundary and the tile grid boundary, which is defined by a mismatch between the image dimensions and code dimensions. Such gap can be visually reduced through one of two ways: (1) making the gap area transparent or (2) animating the scannable code tiles so that their shapes or sizes match with the image border area. In the latter case, scannable code tiles can be animated over time with the desired texture to form the user-supplied image.

Figure 14A:
FIGS. 14a-b illustrate an arbitrary animation of 3D geometry module in the animation software application according to embodiments of the invention.
Figure 14B:
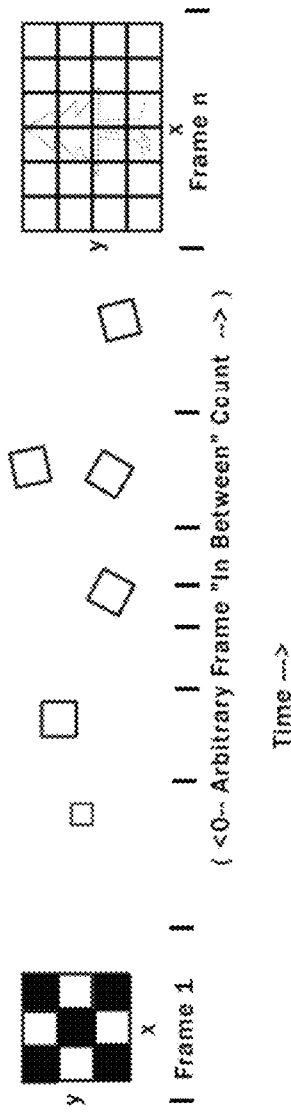

Referring back to FIG. 7, the next module 710 is designed to create an arbitrary animation of 3D geometric tiles. In this module, a standard method known as animation curves in the digital animation industry is applied for all required 3D geometric graphic scannable code components. In other words, industry standard animation keyframes are applied to each 3D geometric graphic scannable code component to keyframes to define the movement of each 3D component object over the time of the animation. This results in a recognizable comprehensive animation of the original code in 3D space. For animations consisting of user-supplied images, code tiles are animated between "landing spot grids" so as to have such a visual effect as if the code tiles move from the "code layout grid" to different positions in the "image layout grid," with the texturing effect applied to each tile. For example, FIG. 14a shows two different user inputs: a scannable code and a user-supplied image. In FIG. 14b, frame 1 shows the code tiles in the "code layout grid" or "code landing space." Frame n shows the code tiles in the "image layout grid" or "image landing space." Over time, somewhere between frame 1 and frame n, the code tiles are animated (e.g., animated positions, colors, textures, sizes and shapes). As a result, the original code is animated in the 3D space.

In some cases the animation curves are created by raw animation key frames with interpolation for the intended effect, while in other cases more elaborate physical simulation engines are applied. Each animation created by the inventive animation software is a uniquely identifiable animation that can be applied to any customer-supplied static graphic scannable code. In this manner a customer can choose to have the same animation applied to an unlimited amount of supplied scannable codes, thus enhancing code branding and uniqueness. In providing the animations, a library of animations and color and code pixel shape customizations are made available for the user or customer to choose from. These colors, shapes, and animations can enhance the branding recognition of the customer's supplied codes to the customer's own clients. One option is to allow the customer to submit a secondary static image or a set of secondary static images, which can be either applied as an overlaid texture to each of the code components, in which case, further customization of the coloring of the animated code is enabled to tailor to the customer's needs, or processed by the application to the determination component "best fit" of final or beginning animation state of original code components, to be blended by animation into the final usable scannable code state, such as a company logo begin transformed via created animation into an arbitrary but usable scannable code. In one embodiment, the set of secondary images submitted by the customer can be used to create a sequence of image blendings between the set of images and the submitted codes.

Figure 15:
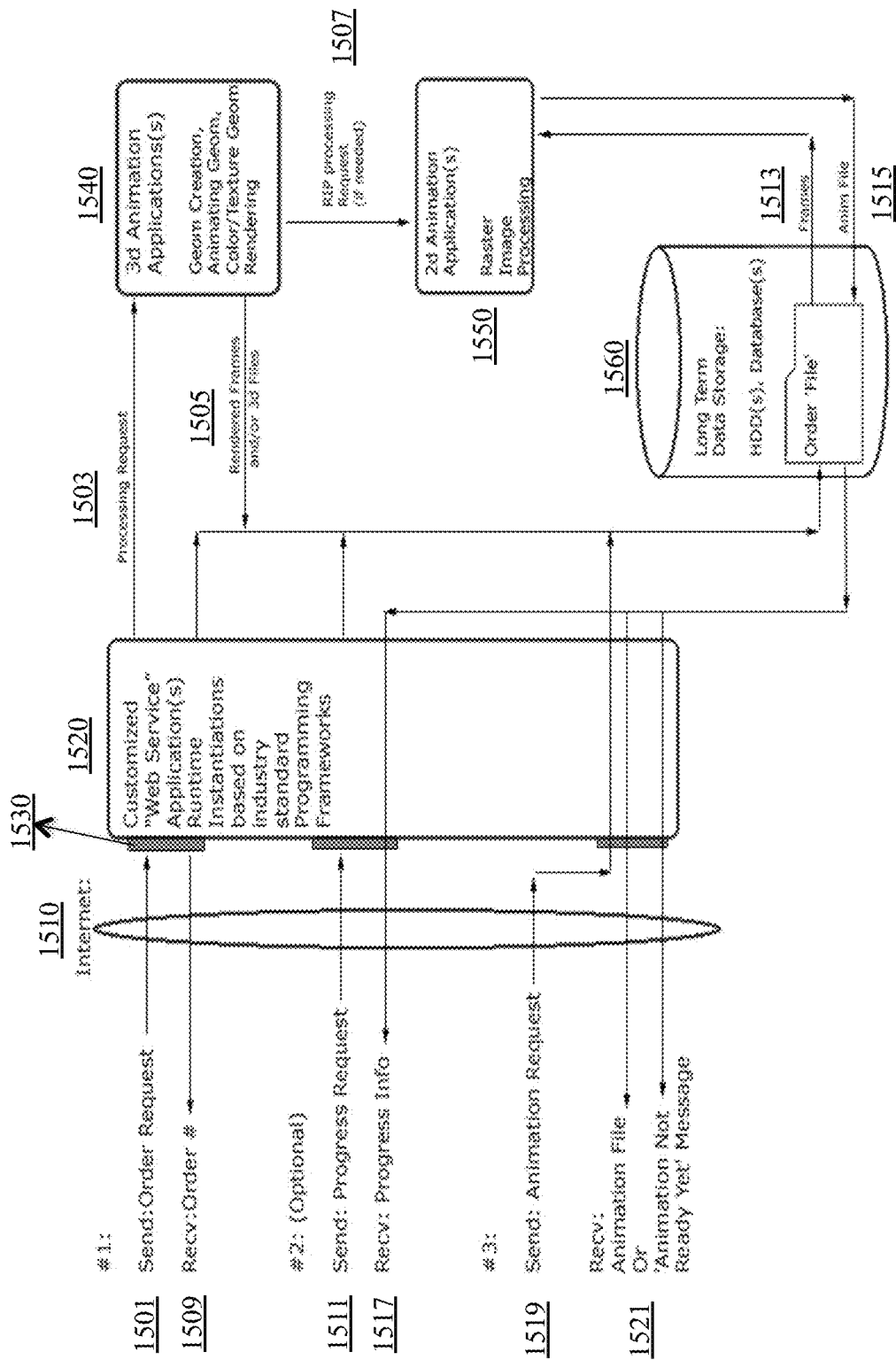
FIG. 15 is a flow diagram illustrating an exemplary data flow in the animation creation process according to embodiments of the invention.

FIG. 15 is a flow diagram illustrating exemplary data flows in the animation creation process according to embodiments of the invention. As shown in FIG. 15, different data flows may be achieved, depending on specific user actions (e.g., user action #1 for ordering an animation, user action #2 for requesting animation progress and user action #3 for requesting a particular animation file). For instance, if a user sends an order request for animation at step 1501, the request will be transmitted over the Internet 1520 to a web-based user interface (e.g., a GUI or URL/URI) 1530, which is coupled with a customized web service or application engine 1520 (e.g., the application server 10 in FIG. 1) configured for generating animations in response to user requests. After initial processing as step 1503, the request is sent to the next 3D animation application module or engine 1540 for further processing, such as creating 3D geometric tiles or icons for the user-supplied image, generating animations of the 3D geometric tiles, or applying colors or textures to the 3D geometric tiles, etc. The resulting animation frames or 3D files are returned to the engine 1520 at step 1505, thereby causing a reply message to be received by the user at step 1509. Or, upon a further RIP processing request at step 1507, the resulting data from the module 1540 is sent to the 2D animation application engine or module 1550 for further processing, such as a raster image processing. The processed data from the module 1550 (e.g., animated files) are then stored in a long-term storage database 1560, which is configured to store a library of animated files for users to order and use any time.

Another data flow in FIG. 15 starts at step 1511, where the user may send a progress request over the Internet 1510 to the application engine 1520, which is configured to search the database 1560 for the progress information. Then, the progress information is returned to the user at step 1517. In the case of a user action to request for a certain type of animation, as seen at step 1519, the system components (e.g., the engine 1520, database 1560) will collaborate and send back the requested animation file at step 1521.

Figure 16:
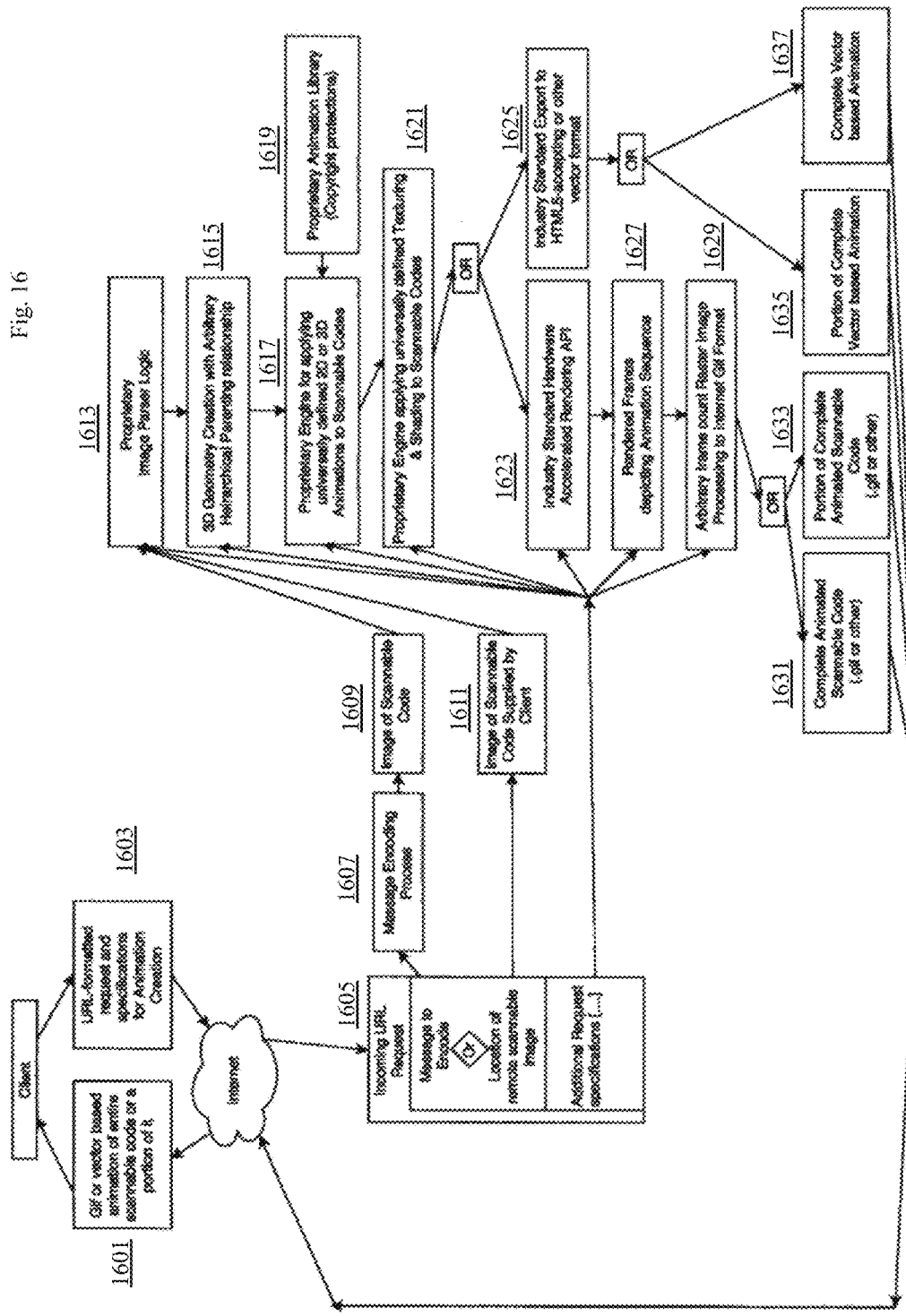
FIG. 16 is a flow diagram illustrating an algorithm underlying the animation software application according to embodiments of the invention.

FIG. 16 is a flow diagram illustrating an algorithm underlying the animation software application according to embodiments of the invention. As shown in FIG. 16, a client, i.e., users or customers of the online application, ranging in size from individuals to government organizations, may submit a request for animation over the Internet. Such a request may include an entire scannable code or a portion thereof based on a .gif or vector file as shown in block 1601. This request can be a URL-formatted request including specifications or parameters for the animation to be generated, such as the color, shape, duration, type, etc., as shown in block 1603.

As shown in block 1605, the incoming URL request is processed to identify whether the request includes actual scannable codes to be animated, or only the data to be embedded in the scannable codes. In the latter case, as shown in blocks 1607-1609, images of scannable codes can be created. Thereafter, either the created scannable codes at block 1609 or the originally-supplied codes at block 1611 is provided as input to a proprietary image parser logic 1613.

Along with the scannable code, animation specifications or parameters as selected by the user are also supplied as input to the logic 1613, as well as other components of the inventive system, such as the 3D geometry creation module or engine 1615, a proprietary engine for applying 2D or 3D animations to scannable codes 1617 interacting with a proprietary animation library 1619, a proprietary engine for applying colors and textures 1621, an accelerated rendering API 1623, an industry standard export for HTML or other vector formats 1625, an engine for rending frames depicting the animation sequence 1627, and an engine for generating an arbitrary frame count raster image processing to Internet GIF format 1629.

In particular, the logic 1613 is configured for processing the 2D image and abstracting 2D data, such as dimensions, positions, shapes and colors of each individual code component, as described above with reference to the module 704 in FIG. 7. The 3D geometry creation engine 1615 is configured for creating a 3D model or framework based on the 2D model, as described above with reference to the module 706 in FIG. 7.

The proprietary engine 1617 is configured to apply any arbitrarily selected animation to any 3D geometry code components. The proprietary engine 1621 is configured to apply any color or texture to any group of 2D or 3D objects or code components.

The API 1623 is capable of using the industry standard "hardware/GPU rendering" to quickly generate individual frame images for the animation. The export component 1625 is capable of delivering the animations according to the industry standard definitions of 2D or 3D objects over time. Unlike the API 1623 that supplies the animation in the common form of a series of images over time, the animation delivery by the export component 1625 is limited to the definition of animations, and the task of creating sequential images to form the final animation is left with the user or customer who will create (render) the animation images with any type of technology of their choice.

The engine 1627 provides the output of the API 1623, which is, the rendered sequence of static images that define the animation over time when viewed in order. The engine 1629 is configured to deliver animations in the industry standard format (".gif"), which defines the sequence of images in a single file. This format is the most widely decipherable and displayable format on electronic displays and by computer systems.

As described above, these system components are programmed to, collaboratively, generate animations in response to the user's request. The animated profiles can include a complete animated scannable code (.GIF or other format) as shown in block 1631, or a portion of the complete animated scannable code (.GIF or other format) as shown in block 1633, or a portion of a complete vector-based animation file as shown in block 1635 or the complete vector-based animation file as shown in block 1637.

It should be understood that FIG. 16 is for illustration only, and various combinations or variations of the illustrated components may be implemented to achieve embodiments of the invention.

Embodiments of the invention provide a cost-effective way for individual users to have highly customized and visually appealing versions of their scannable codes containing their personal information. For example, a user may allow a friend to scan his or her customized code, which is animated and more visually appealing, to form a connection on a social network. As another example, using the present invention, a business salesman may create an animated code for his business card or image, which would be more eye-catching and novel compared to traditional static business cards. Because the animations created by the present invention acquire the desired attention to the scannable codes much more easily due to their movement, embodiments of the invention can be utilized in various case scenarios for promoting company brand identities. In addition, information security can be enhanced through the present invention.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

What is claimed is:

1. A method for generating animations for user-submitted scannable codes, including:
receiving a user request over a network for creating animation of scannable codes, the user request including either one or more scannable codes or a message to be embedded in the scannable codes;
receiving a plurality of animation parameters selected by the user;
generating an animated file based on the animation parameters for the user's preview, the animated file including animations of the scannable codes; and
upon the user's confirmation of purchase, sending the animated file for a display on the user's device,
wherein generating an animated file further comprises:
detecting the scannable codes from the user request;
abstracting 2 dimensional (2D) data from the detected scannable codes, the 2D data including locations, dimensions, color and shape of each code tile in the scannable codes;
storing the 2D data in a tile database; and
based on the abstracted 2D data, converting a 2D model of the scannable codes into a 3 dimensional (3D) model of the scannable codes, the 3D model comprising a plurality of 3D geometric icons based on the 2D code tiles.

2. The method of claim 1, further comprising:
creating the scannable codes for the message if the user request includes only the message to be embedded, the message including a user-supplied image.

3. The method of claim 1, further comprising displaying the animated file on the user's device in either a static state or animated state.

4. The method of claim 1, further comprising allowing the user to scan the animated file for information embedded in the animated file.

5. The method of claim 1, wherein the plurality of 3D geometric icons are animated in either a 2D space or a 3D space.

6. The method of claim 1, wherein generating the animated file further comprises applying colors and textures to the plurality of 3D geometric icons.

7. The method of claim 6, wherein generating the animated file further comprises:
identifying a first list of landing spots for the scannable codes and a second list of landing spots for an original image corresponding to the scannable codes;
comparing the first and second lists to identify additional tiles; and
creating animations of the additional tiles so that the additional tiles are animated to match border areas of the codes and image.

8. The method of claim 7, wherein generating the animated file further comprises arbitrarily selecting one or more frames of animation out of all animation frames created for the scannable codes, wherein the additional tiles are animated with various animated positions, colors, textures, sizes and shapes during the selected one or more frames.

9. A computer program product comprising a computer usable non-transitory medium having a computer readable program code embedded therein for controlling a computer, the computer readable program code configured to cause the computer to execute a process for generating animations for user-submitted scannable codes, the process comprising the steps of:
receiving a user request over a network for creating animation of scannable codes, the user request including either one or more scannable codes or a message to be embedded in the scannable codes;
receiving a plurality of animation parameters selected by the user;
generating an animated file based on the animation parameters for the user's preview, the animated file including animations of the scannable codes; and
upon the user's confirmation of purchase, sending the animated file for a display on the user's device,
wherein generating an animated file further comprises:
detecting the scannable codes from the user request;
abstracting 2 dimensional (2D) data from the detected scannable codes, the 2D data including locations, dimensions, color and shape of each code tile in the scannable codes;
storing the 2D data in a tile database; and
based on the abstracted 2D data, converting a 2D model of the scannable codes into a 3 dimensional (3D) model of the scannable codes, the 3D model comprising a plurality of 3D geometric icons based on the 2D code tiles.

10. The computer program product of claim 9, wherein the process comprises further steps of:
creating the scannable codes for the message if the user request includes only the message to be embedded, the message including a user-supplied image.

11. The computer program product of claim 9, wherein the process comprises further steps of displaying the animated file on the user's device in either a static state or animated state.

12. The computer program product of claim 9, wherein the process comprises further steps of allowing the user to scan the animated file for information embedded in the animated file.

13. The computer program product of claim 9, wherein the plurality of 3D geometric icons are animated in either a 2D space or a 3D space.

14. The computer program product of claim 9, wherein the step of generating the animated file further comprises applying colors and textures to the plurality of 3D geometric icons.

15. The computer program product of claim 14, wherein the step of generating the animated file further comprises:

identifying a first list of landing spots for the scannable codes and a second list of landing spots for an original image corresponding to the scannable codes;

comparing the first and second lists to identify additional tiles; and creating animations of the additional tiles so that the additional tiles are animated to match border areas of the codes and image.

16. The computer program product of claim 15, wherein the step of generating the animated file further comprises arbitrarily selecting one or more frames of animation out of all animation frames created for the scannable codes, wherein the additional tiles are animated with various animated positions, colors, textures, sizes and shapes during the selected one or more frames.

\* \* \* \* \*